US011136918B2

(12) United States Patent
Muralidharan et al.

(10) Patent No.: US 11,136,918 B2
(45) Date of Patent: Oct. 5, 2021

(54) METHOD AND APPARATUS FOR COOLING WATER SYSTEM OPTIMIZATION

(71) Applicant: General Electric Company, Schenectady, NY (US)

(72) Inventors: Vikram Srinivas Muralidharan, Hyderabad (IN); Rajeev Kumar Verma, Kuala Lumpur (MY); Karl D. Minto, Greenville, SC (US); Mohamed Yassar, Hyderabad (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 145 days.

(21) Appl. No.: 16/741,910

(22) Filed: Jan. 14, 2020

(65) Prior Publication Data

US 2021/0189964 A1    Jun. 24, 2021

Related U.S. Application Data

(60) Provisional application No. 62/952,690, filed on Dec. 23, 2019.

(51) Int. Cl.
*F02C 7/16*        (2006.01)
*F01D 25/12*       (2006.01)
*F04D 29/58*       (2006.01)

(52) U.S. Cl.
CPC ............... *F02C 7/16* (2013.01); *F01D 25/12* (2013.01); *F04D 29/5833* (2013.01);
(Continued)

(58) Field of Classification Search
CPC ...... F02C 7/16; F04D 15/0066; F04D 15/029; F04D 15/0088; F04D 25/166;
(Continued)

(56) References Cited

U.S. PATENT DOCUMENTS

2003/0046939 A1 *   3/2003   Hyakutake .............. F01D 21/12
                                                        60/782
2011/0060470 A1     3/2011   Campbell et al.
(Continued)

FOREIGN PATENT DOCUMENTS

WO          0131177 A1      2/2001

*Primary Examiner* — Audrey B. Walter
*Assistant Examiner* — Dapinder Singh
(74) *Attorney, Agent, or Firm* — Eversheds Sutherland (US) LLP

(57) ABSTRACT

The present application provides a method of optimizing fan usage in a cooling water system having a number of fans with a heat exchanger to cool a cooling fluid for use with a number of gas turbine subsystems. The method may include the steps of running all of the fans at base load, calculating a heat transfer capability of each fan at base load, calculating a temperature difference between an actual temperature and a target temperature of the cooling fluid, selecting a minimum target temperature of the cooling fluid, calculating a target thermal energy of the cooling fluid for the minimum target temperature, calculating a number of the fans to be turned on or off by dividing the target thermal energy with the heat transfer capability of each fan, and turn on or off the calculated number of fans in a predetermined manner with an objective of balancing the running hours of each fan.

20 Claims, 4 Drawing Sheets

(52) U.S. Cl.
CPC .... *F05D 2260/232* (2013.01); *F05D 2270/20* (2013.01); *F05D 2270/303* (2013.01); *F05D 2270/44* (2013.01)

(58) Field of Classification Search
CPC .. F04D 27/001; F04D 27/004; F04D 29/5833; F04D 29/582; F04D 29/586; F05D 2270/44; F05D 2270/303; F05D 2270/20; F05D 2260/232
See application file for complete search history.

(56) References Cited

U.S. PATENT DOCUMENTS

| | | |
|---|---|---|
| 2013/0046519 A1 | 2/2013 | Esakki et al. |
| 2014/0139016 A1* | 5/2014 | Lovercheck ........ B60L 15/2045 307/9.1 |
| 2016/0031542 A1* | 2/2016 | Yin ........................ F04D 27/00 700/282 |
| 2018/0245519 A1 | 8/2018 | Verma et al. |
| 2018/0372000 A1* | 12/2018 | Fujii ........................ F02C 9/00 |

* cited by examiner

METHOD AND APPARATUS FOR COOLING WATER SYSTEM OPTIMIZATION

TECHNICAL FIELD

The present application and the resultant patent relate generally to gas turbine engines and more particularly relate to improved methods and apparatus for the operational optimization of a closed loop cooling water system and the components thereof.

BACKGROUND OF THE INVENTION

In a gas turbine engine, hot combustion gases generated in one or more combustors flow along a hot gas path extending through a turbine, a heat recovery steam generator, and elsewhere. The components of the gas turbine engine thus are subjected to the extremely high combustion gas temperatures. Because the efficiency of a gas turbine engine is dependent on the operating temperatures, there is an ongoing demand for the gas turbine engine components to be capable of withstanding increasingly higher temperatures without deterioration, failure, or a decrease in the overall useful lifetime. Different types of cooling systems therefore may be deployed to cool the various components. Because these cooling systems may be considered a parasitic drain on overall gas turbine engine performance, the optimization of such cooling systems may improve overall gas turbine engine performance and efficiency.

SUMMARY OF THE INVENTION

The present application and the resultant patent thus provide a method of optimizing fan usage in a cooling water system having a number of fans with a heat exchanger to cool a cooling fluid for use with a number of gas turbine subsystems. The method may include the steps of running all of the fans at base load, calculating a heat transfer capability of each fan at base load, calculating a temperature difference between an actual temperature and a target temperature of the cooling fluid, selecting a minimum target temperature of the cooling fluid, calculating a target thermal energy of the cooling fluid for the minimum target temperature, calculating a number of the fans to be turned on or off by dividing the target thermal energy with the heat transfer capability of each fan, and turn on or off the calculated number of fans in a predetermined manner with an objective of balancing the running hours of each fan.

The present application and the resultant patent further provide a cooling water system for cooling a number of gas turbine subsystems with a cooling fluid. The cooling water system may include a heat exchanger, a number of fans positioned about the heat exchanger, a pump to pump the cooling fluid between the gas turbine subsystems and the heat exchanger, and a fan optimization module to determine a number of the fans to be used. The fan optimization module may be configured to calculate a heat transfer capability of each fan at base load, calculate a temperature difference between an actual temperature and a target temperature of the cooling fluid, select a minimum target temperature of the cooling fluid, calculate a target thermal energy of the cooling fluid for the minimum target temperature, calculate a number of the fans to be turned on or off by dividing the target thermal energy with the heat transfer capability of each fan, and turn on or off the calculated number of fans in a predetermined manner with an objective of balancing the running hours of each fan.

The present application and the resultant patent further provide a non-transitory computer readable storage medium storing one or more processor-executable instructions wherein the one or more instructions, when executed by a controller, cause acts to be perform to optimizing fan usage in a cooling water system having a number of fans with a heat exchanger to cool a cooling fluid for use with a number of gas turbine subsystems. The instructions may include running all of the fans at base load, calculating a heat transfer capability of each fan at base load, calculating a temperature difference between an actual temperature and a target temperature of the cooling fluid, selecting a minimum target temperature of the cooling fluid, calculating a target thermal energy of the cooling fluid for the minimum target temperature, calculating a number of the fans to be turned on or off by dividing the target thermal energy with the heat transfer capability of each fan, and turn on or off the calculated number of fans in a predetermined manner with an objective of balancing the running hours of each fan.

These and other features and improvements of the present application and the resultant patent will become apparent to one of ordinary skill in the art upon review of the following detailed description when taken in conjunction with the several drawings and the appended claims.

DETAILED DESCRIPTION

Figure 1:
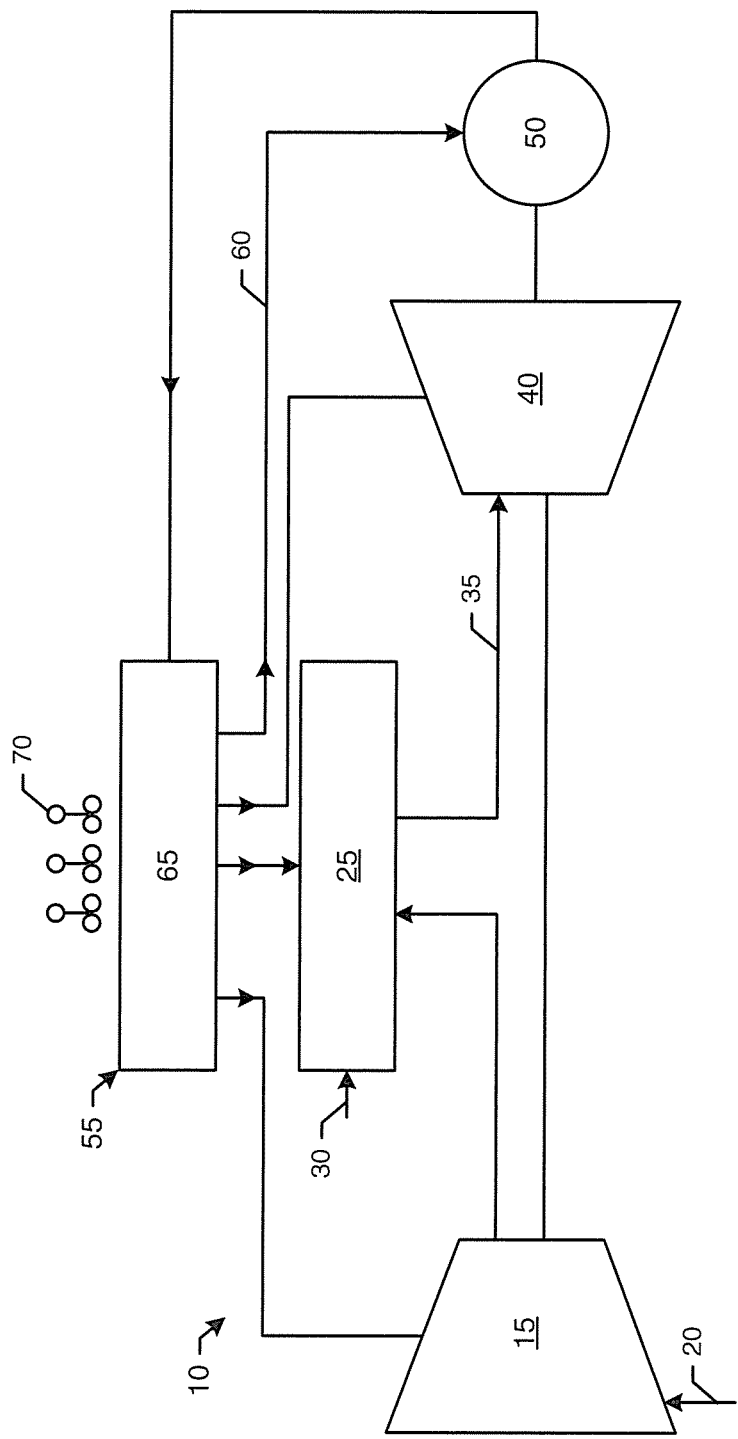
FIG. 1 is a schematic diagram of an exemplary gas turbine engine showing a compressor, a combustor, a turbine, a load, and a cooling water system.

Referring now to the drawings, in which like numerals refer to like elements throughout the several views, FIG. 1 shows a schematic diagram of gas turbine engine 10 as may be used herein. The gas turbine engine 10 may include a compressor 15. The compressor 15 compresses an incoming flow of air 20. The compressor 15 delivers the compressed flow of air 20 to a number of combustor cans 25. The combustor cans 25 mix the compressed flow of air 20 with a pressurized flow of fuel 30 and ignite the mixture to create a flow of hot combustion gases 35. Although only a single combustor can 25 is shown, the gas turbine engine 10 may include any number of combustor cans 25 positioned in a circumferential array and the like. The flow of the hot combustion gases 35 is in turn delivered to a turbine 40. The flow of the hot combustion gases 35 drives the turbine 40 so as to produce mechanical work. The mechanical work produced in the turbine 40 drives the compressor 15 via a shaft 45 and an electrical generator 50 or other type of an external load and the like.

The gas turbine engine 10 may use natural gas, various types of syngas, liquid fuels, and/or other types of fuels and blends thereof. The gas turbine engine 10 may be any one of a number of different gas turbine engines offered by General Electric Company of Schenectady, N.Y., including, but not limited to, those such as a 7 or a 9 series heavy duty gas turbine engine and the like. The gas turbine engine 10 may have different configurations and may use other types of components. Other types of gas turbine engines also may be used herein. Multiple gas turbine engines, other types of turbines, and other types of power generation equipment also may be used herein together.

The gas turbine engine 10 also may have a cooling water system 55 to cool the various components therein. In this example, the cooling water system 55 may use a flow of a cooling fluid 60 such as water cooled in an air to water heat exchanger 65 in a closed loop fashion. The flow of the cooling fluid 60 passing through the air to water heat exchanger 65 may be cooled by a flow of air produced by a number of fans 70 or other types of air movement devices. Other type of cooling systems and components may be used herein.

Figure 2:
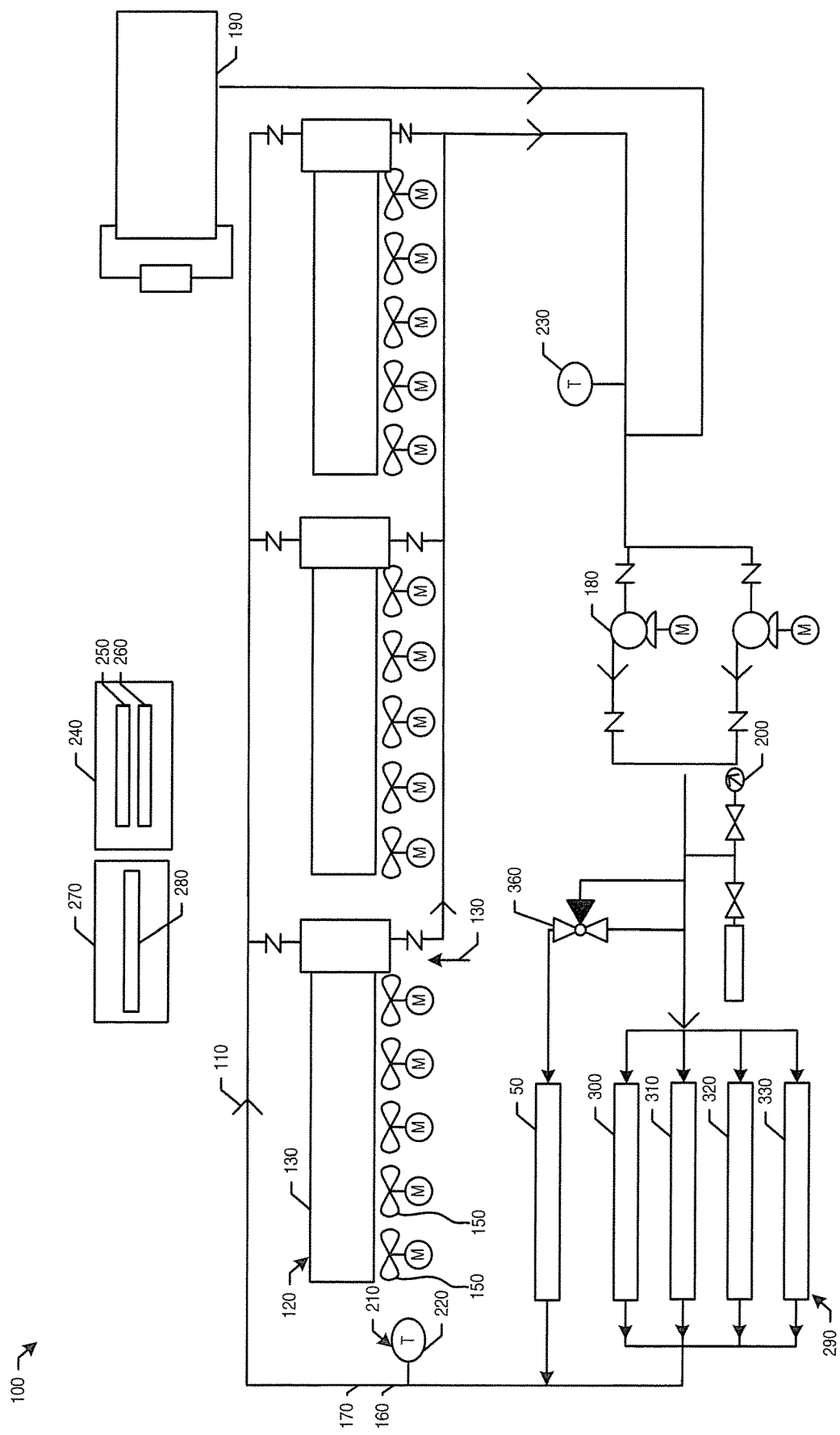
FIG. 2 is a schematic diagram of an example of a cooling water system as may be described herein.

FIG. 2 shows a schematic diagram of a cooling water system 100 as may be described herein for use with the gas turbine engine 10 and the like. The cooling water system 100 may cool any number of the component of the gas turbine engine 10 and elsewhere with one or more flows of a cooling fluid 110 such as water or other types of fluids. The cooling water system 100 may have a number of heat exchangers 120 positioned in parallel or otherwise arranged. Any number of the heat exchangers 120 may be used herein. In this example, the heat exchangers 120 may be air to water heat exchangers 130. More specifically, the air to water heat exchangers 130 may include a number of finned tubes (not shown) and the like to exchange heat between the flow of the cooling fluid 110 and a flow of air 140. Other types of heat exchangers may be used herein. The flow of air 140 may be produced by a number of fans 150 or other types of air movement devices. Any number of fans 150 may be used herein. Any type of conventional fan and the like may be used herein. Other components and other configurations may be used herein.

The cooling water system 100 may operate in a closed loop 160 fashion via one or more cooling fluid lines 170. One or more pumps 180 may be positioned on the cooling water lines 170 in a parallel configuration or otherwise arranged. The pumps 180 may be of conventional design. Other types of fluid movement devices may be used herein. An expansion tank 190 or a similar device may be positioned on the cooling fluid lines 170 to accommodate the pressure therein. A make-up fluid source 200 may be in communication with the cooling fluid lines 170. The make-up fluid source 200 ensures that the volume of the cooling fluid 110 in the cooling water system 100 remains relatively constant. Other components and other configurations may be used herein.

The cooling water system 100 may have a number of sensors 210. The sensors 210 may include at least an incoming temperature sensor 220 and an outgoing temperature sensor 230 positioned on both sides of the heat exchangers 120. The temperature sensors 220, 230 may be of conventional design. Other types of sensors 210 related to any type of operational parameter may be used herein.

The cooling water system 100 may include one or more controllers 240 (e.g., an electronic and/or processor-based controller) to govern operation of the cooling water system 100. The controller 240 may be part of a distributed control system for the gas turbine engine 10 and the overall power plant. The controller 240 may independently control operation of the cooling water system 100 based on at least feedback received from sensors 210, as well as control valves, pumps, and/or other features. Each controller 240 may include a memory 250 (e.g., a non-transitory computer-readable medium/memory circuitry) communicatively coupled to a processor 260. Each memory 250 stores one or more sets of instructions (e.g., processor-executable instructions) implemented to perform operations related to the components of the cooling water system 100. More specifically, the memory 250 may include volatile memory, such as random access memory (RAM), and/or non-volatile memory, such as read-only memory (ROM), optical drives, hard disc drives, or solid-state drives. Additionally, the processor 260 may include one or more application specific integrated circuits (ASICs), one or more field programmable gate arrays (FPGAs), one or more general-purpose processors, or any combination thereof. Furthermore, the term "processor" is not limited to just those integrated circuits referred to in the art as processors, but broadly refers to computers, processors, microcontrollers, microcomputers, programmable logic controllers, application specific integrated circuits, and other programmable circuits.

The controller 240 may be coupled to a service platform 270. The service platform 270 may be a software platform for collecting data from the cooling water system 100. By way of example, the service platform 270 may be a cloud-based platform such as a service (PaaS). The service platform 270 may perform industrial-scale analytics to analyze performance of and enhance or improve operation of the cooling water system 100. The service platform 270 may be coupled to a database 280. The database 280 and/or the memory 250 may store historical data related to the cooling water system 100, one or more models, and other data. Other components and other configurations may be used herein.

The cooling water system 100 may be used to cool the generator 50 as well as other types of subsystems 290 used with the gas turbine engine 10. These subsystems 290 may include a lubricating oil cooler 300. As described above, the turbine 40 and the generator 50 are connected by the rotating shaft 45. The shaft 45 may be supported by a number of bearings. A lubricating oil stream thus may continually lubricate the bearings. The lubricating oil cooler 300 thus cools the lubricating oil stream. Another subsystem 290 may include an atomizing air cooler 310. A flow of compressor discharge air may be cooled in the atomizing air cooler 310 and may be used to atomize the flow of fuel 30 in the combustor 25. A further subsystem 290 may include a flame detector cooler 320. One or more flame detectors may be positioned about the combustor 25 to determine the presence of combustion therein. The flame detector cooler 320 cools the flame detectors therein. A further subsystem 290 may include a turbine support cooler 330. The gas turbine engine 10 may include any number of support structures positioned adjacent to the hot gas path. The turbine support cooler 330 cools the support structures. The generator 50 also may include a number of subsystems 290. These subsystems 290 may include a generator cooler 340 to cool the generator 50, a generator gas dryer 340 to cool the gas stream, as well as a load-commutated inverter cooler 350 for start-up operations and the like. Other components and other configurations may be used herein.

Any number of subsystems 290 may be used herein in any configuration. The cooling fluid 110 may flow through each of the subsystems 290 for heat exchange therewith before returning to the heat exchangers 120 in the closed loop 160. Specifically, the cooling fluid lines 170 may run through the generator 50 and then, depending on the overall cooling needs, run through some or all of the subsystems 290. A three-way temperature control valve 360 may divert some or all of the flow of the cooling fluid 110 to the generator 50 and tone or more of the subsystems 290. Operation of the temperature control valve 360 may be controlled by the controller 240. The temperature control valve 360 may be of conventional design. Other components and other configurations may be used herein.

Figure 3:
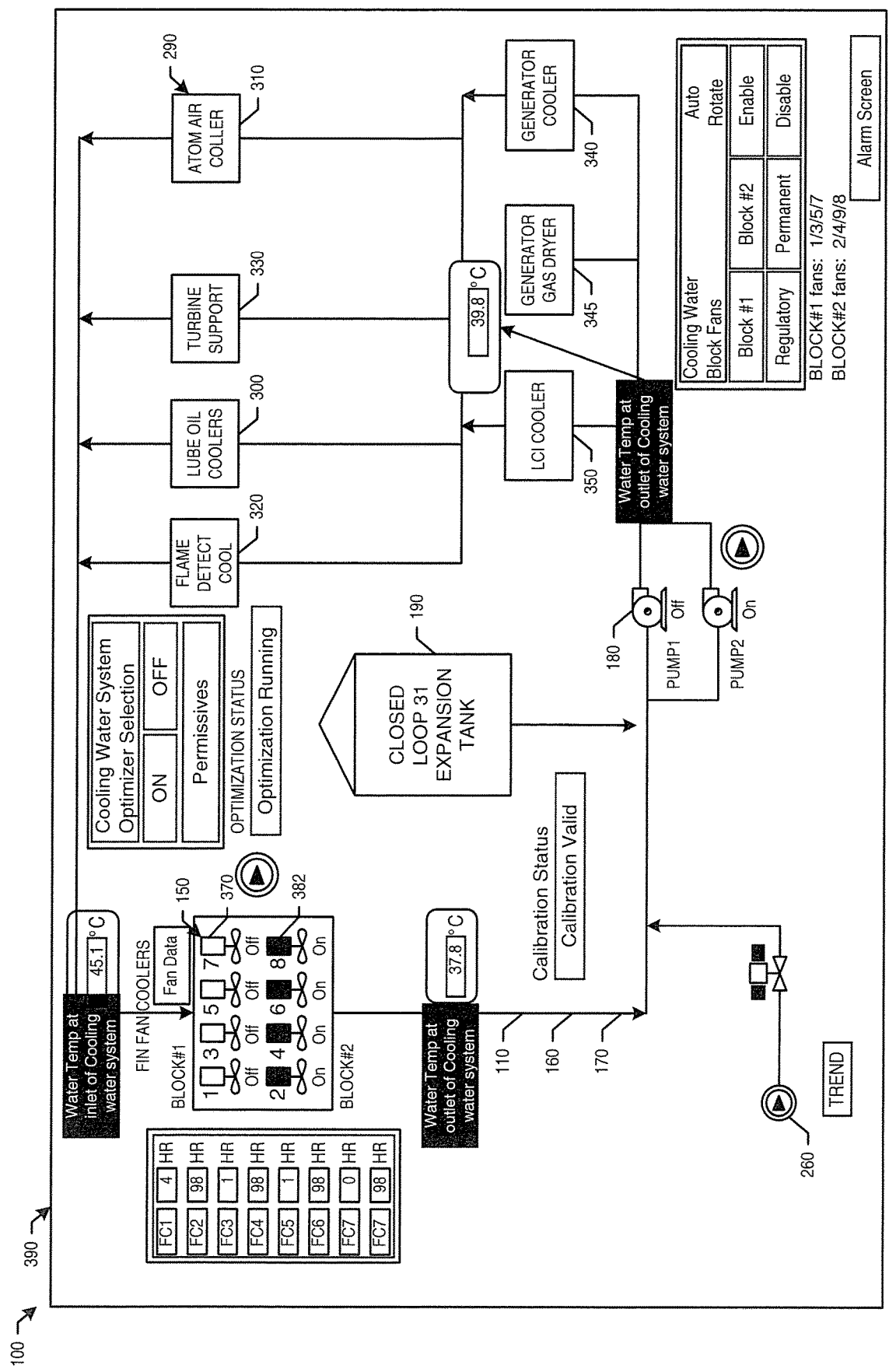
FIG. 3 is a schematic diagram of an example of a graphical user interface showing the operation of the cooling water system of FIG. 2.

Depending on the overall amount of cooling required, not all of the fans 150 used with the heat exchangers 120 need be operational at all times. Rather, a number of the fans 150 may be turned off until needed so as to reduce the overall parasitic or auxiliary energy consumption. The cooling water system 100 thus may optimize overall fan usage. Specifically, each heat exchanger 120 may have a number of permanent fans 370, i.e., fans 150 that are always on, and a number of regulatory fans 380, i.e., fans 150 that may be turned on as needed. The number of permanent fans 370 and the number of regulatory fans 380 may vary. FIG. 3 shows a graphical user interface 390 showing operation of the cooling water system 100 indicating the fans 150 in use, the hours of use for each fan 150, and the applicable system temperatures. Other components and other configurations may be used herein.

Figure 4:
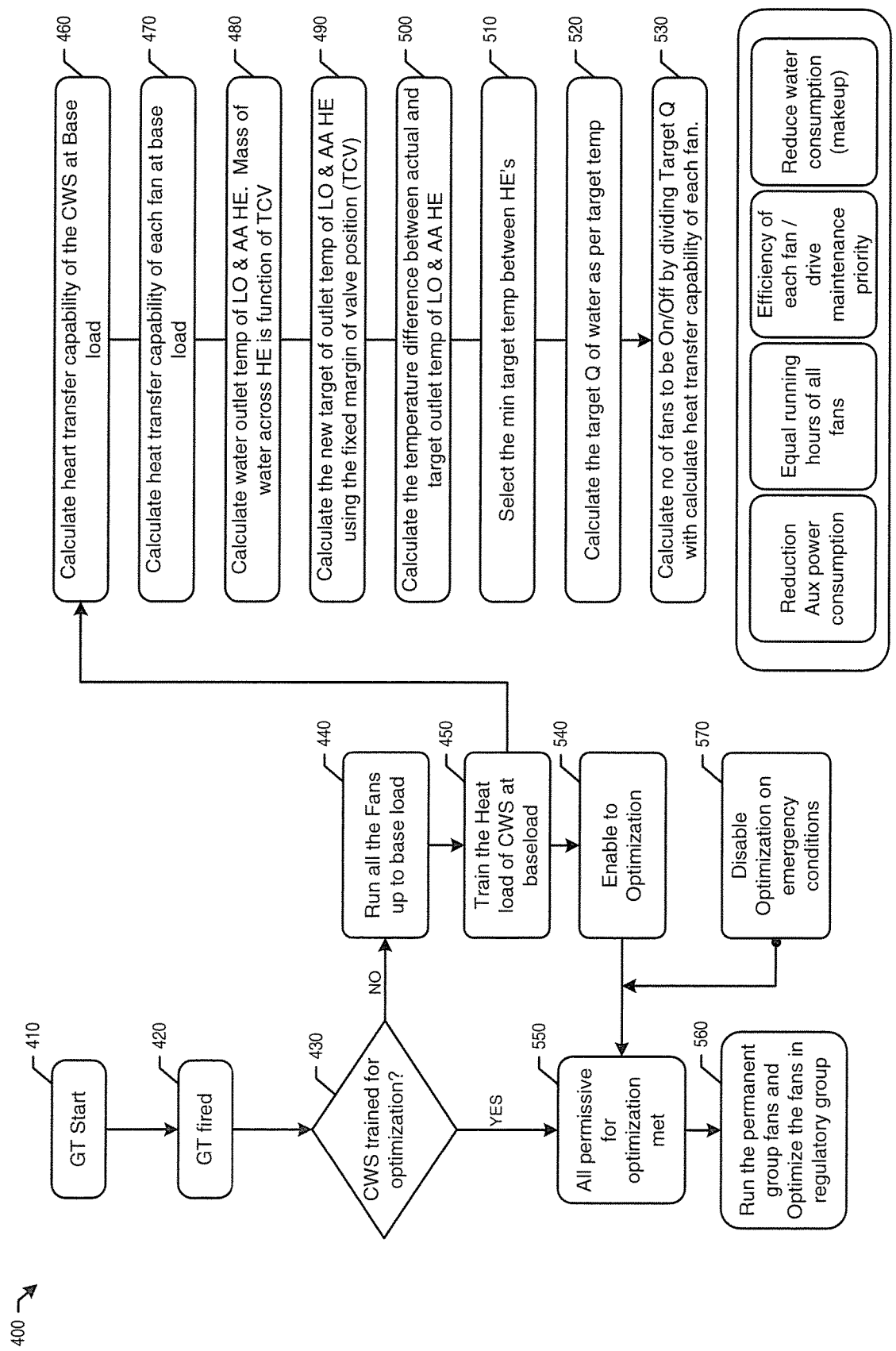
FIG. 4 is a flow chart of exemplary steps in the operation of an optimization module of the cooling water system of FIG. 2.

FIG. 4 shows a flow chart with exemplary steps in a fan optimization module 400 as may be described herein. Other and different method steps may be used herein in any order. At step 410, the gas turbine engine 10 may be started. After normal start-up, the gas turbine engine 10 may be fired in a conventional fashion at step 420. At step 430, the controller 240 determines if the cooling water system 100 has been trained for fan optimization.

If not, all of the fans 150 may be run up to base load at step 440. At step 450, the overall heat load of the cooling water system 100 may be determined. This may involve steps such as calculating the heat transfer capability of the cooling water system 100 at base load at step 460, calculating the heat transfer capability of each fan 150 at base load at step 470, calculate the temperature of the cooling fluid 110 at the outlets of the subsystems 290 or elsewhere at step 480 (the mass of cooling fluid across the subsystems 290 may be a function of the temperature control valve 360), calculate a new target temperature of the cooling fluid 110 at the outlets of the subsystems 290 or elsewhere according to a fixed margin of the position of the temperature control valve 360 at step 490, calculate the difference between the actual and the target cooling fluid temperatures at step 500, select a minimum target temperature at step 510, calculate a target thermal energy (Q in Joules) for the cooling fluid 110 according to the minimum target temperature at step 520, and calculate the number of fans 150 to be turned on/off by dividing the target thermal energy with the calculated heat transfer capability of each fan at step 530.

At step 540, the cooling water system 100 thus may be enabled for optimization. At step 550, all permissives for optimization may be met. At step 560, the cooling water system 100 runs the all of the permanent fans 370 and the selected number of regulatory fans 380. Because the fans 150 are turned on/off in a staggered manner, the optimization steps may be repeated till the target temperature is achieved after turning on/off each fan 150, or according to a predetermined schedule or in response to one or more operational parameters and the like. In an optional step 570, all fans 150 may be turned on if emergency conditions are determined.

The benefits of the optimization module 400 thus may include a reduction in the overall auxiliary or parasitic energy consumption, equalization of the running hours for each fan 150 for uniform performance, and a determination of the efficiency of each fan 150. Such a determination may indicate which fans 150 may require maintenance priority and/or replacement. A further benefit may be a reduction in the overall volume of make-up fluid consumption by limiting evaporation.

Specifically, the optimization module 400 baselines the cooling water system 100 with all of the cooling fans 150 running so as to determine the current capability of the overall system 100. Once such optimization is enabled with the reference of the baseline capability, the optimization module 400 may determine how many fans 150 may be turned on or off in a staggered manner. Because the optimization module 400 works to reduce any errors in the system 100 rather than determining an absolute requirement, the optimization module 400 helps in recursive tuning of the loop with a lesser probability of failure. The optimization module 400 may run on the controller 240 or on a cloud-based environment that can remotely set or provide an advisory to regulate the cooling water system 400.

The optimization module thus determines the most efficient fan 150 in the cooling water system 100 and drives the maintenance priority of each fan 150. The module 400 uses a simple heat load calculation to determine the heat transfer capability of the cooling water system 100 at the worst condition. By measuring the various heat load components in the system 100, the optimization module 400 determines the available margin and pushes the system 100 to operate closer to the margin. The optimization module 400 utilizes the existing plant instrumentation to measure, for example, the lubricating oil temperature, the atomizing air temperature, the cooling fluid inlet and outlet temperature, the position of temperature control valve, ambient conditions, and other parameters so as to determine the current heat energy exchange capability of the cooling water system 100, and suggests the optimal amount of cooling required for the current operating condition. The optimization module 400 thus reduce the overall axillary or parasitic power consumption, enhances the lifecycle of cooling water system 100, reduces the volume of cooling fluid make-up, increase the availability of cooling water system 100 by extending the factored maintenance interval, and provides flexibility to choose the fans 150 to be operated in optimization mode.

It should be apparent that the foregoing relates only to certain embodiments of the present application and the resultant patent. Numerous changes and modifications may be made herein by one of ordinary skill in the art without departing from the general spirit and scope of the invention as defined by the following claims and the equivalents thereof.

We claim:

1. A method of optimizing fan usage in a cooling water system having a number of fans with a heat exchanger to cool a cooling fluid for use with a number of gas turbine subsystems, comprising:
    running all of the fans at base load;
    calculating a heat transfer capability of each fan at base load;
    calculating a temperature difference between an actual temperature and a target temperature of the cooling fluid;
    selecting a minimum target temperature of the cooling fluid;
    calculating a target thermal energy of the cooling fluid for the minimum target temperature;
    calculating a number of the fans to be turned on or off by dividing the target thermal energy with the heat transfer capability of each fan; and
    turning on or off the calculated number of fans.

2. The method of claim 1, wherein the step of calculating a temperature difference between an actual temperature and a target temperature of the cooling fluid comprises calculating a temperature difference at a lubricating oil cooler.

3. The method of claim 1, wherein the step of calculating a temperature difference between an actual temperature and a target temperature of the cooling fluid comprises calculating a temperature difference at an atomizing air cooler.

4. The method of claim 1, wherein the step of calculating a temperature difference between an actual temperature and a target temperature of the cooling fluid comprises calculating a temperature difference at a flame detector cooler.

5. The method of claim 1, wherein the step of calculating a temperature difference between an actual temperature and a target temperature of the cooling fluid comprises calculating a temperature difference at a turbine support cooler.

6. The method of claim 1, wherein the step of calculating a temperature difference between an actual temperature and a target temperature of the cooling fluid comprises calculating a temperature difference at a generator cooler.

7. The method of claim 1, wherein the step of calculating a temperature difference between an actual temperature and a target temperature of the cooling fluid comprises calculating a temperature difference at a generator gas dryer cooler.

8. The method of claim 1, wherein the step of calculating a temperature difference between an actual temperature and a target temperature of the cooling fluid comprises calculating a temperature difference at a load-commutated inverter cooler.

9. The method of claim 1, wherein the step of turning on or off the calculated number of fans comprises turning on or off a calculated number of regulatory fans and leaving on a number of permanent fans.

10. The method of claim 1, wherein the step of calculating a temperature difference between an actual temperature and a target temperature of the cooling fluid comprises determining a mass of the cooling fluid across the gas turbine subsystems based on a position of a temperature control valve.

11. The method of claim 1, further comprising the step of determining a maintenance priority for each fan based upon the calculated heat transfer capability.

12. The method of claim 1, further comprising pumping the cooling fluid though the cooling water system with a number of pumps.

13. The method of claim 12, further comprising turning on or off one or more of the number of pumps based upon the calculated number of fans.

14. The method of claim 1, further comprising the step of turning on all fans if emergency conditions are determined.

15. A cooling water system for cooling a number of gas turbine subsystems with a cooling fluid, comprising:
a heat exchanger;
a plurality of fans positioned about the heat exchanger;
a pump to pump the cooling fluid between the gas turbine subsystems and the heat exchanger; and
a fan optimization module to determine a number of the plurality of fans to be used;
the fan optimization module configured to:
calculate a heat transfer capability of each fan at base load;
calculate a temperature difference between an actual temperature and a target temperature of the cooling fluid;
select a minimum target temperature of the cooling fluid;
calculate a target thermal energy of the cooling fluid for the minimum target temperature;
calculate a number of the fans to be turned on or off by dividing the target thermal energy with the heat transfer capability of each fan; and
turn on or off the calculated number of fans.

16. The cooling water system of claim 15, wherein the heat exchanger comprises an air to water heat exchanger.

17. The cooling water system of claim 15, further comprising a temperature control valve positioned downstream of the pump to bypass the gas turbine subsystems.

18. The cooling water system of claim 15, further comprising a plurality of temperature sensors.

19. The cooling water system of claim 18, wherein a first one of the plurality of temperature sensors is positioned upstream of the heat exchanger and a second one of the plurality of temperature sensors is positioned downstream of the heat exchanger.

20. A non-transitory computer readable storage medium storing one or more processor-executable instructions wherein the one or more instructions, when executed by a controller, cause acts to be perform to optimizing fan usage in a cooling water system having a number of fans with a heat exchanger to cool a cooling fluid for use with a number of gas turbine subsystems, comprising:
running all of the fans at base load;
calculating a heat transfer capability of each fan at base load;
calculating a temperature difference between an actual temperature and a target temperature of the cooling fluid;
selecting a minimum target temperature of the cooling fluid;
calculating a target thermal energy of the cooling fluid for the minimum target temperature;
calculating a number of the fans to be turned on or off by dividing the target thermal energy with the heat transfer capability of each fan; and
turning on or off the calculated number of fans.

* * * * *